(12) United States Patent
Cieszkowski, III et al.

(10) Patent No.: US 11,850,508 B2
(45) Date of Patent: Dec. 26, 2023

(54) SYSTEM FOR SIMULATING AN OUTPUT IN A VIRTUAL REALITY ENVIRONMENT

(71) Applicant: Osirius Group, LLC, Troy, MI (US)

(72) Inventors: Richard Matthew Cieszkowski, III, Bloomfield Hills, MI (US); Timothy David Smith, Bloomfield Hills, MI (US)

(73) Assignee: OSIRIUS GROUP, LLC, Troy, MI (US)

( * ) Notice: Subject to any disclaimer, the term of this patent is extended or adjusted under 35 U.S.C. 154(b) by 0 days.

(21) Appl. No.: 17/281,010

(22) PCT Filed: Sep. 30, 2019

(86) PCT No.: PCT/US2019/053786
§ 371 (c)(1),
(2) Date: Mar. 29, 2021

(87) PCT Pub. No.: WO2020/069493
PCT Pub. Date: Apr. 2, 2020

(65) Prior Publication Data
US 2021/0339135 A1    Nov. 4, 2021

Related U.S. Application Data

(60) Provisional application No. 62/738,398, filed on Sep. 28, 2018.

(51) Int. Cl.
*A63F 13/428* (2014.01)
*A63F 13/211* (2014.01)
*A63F 13/25* (2014.01)

(52) U.S. Cl.
CPC .......... *A63F 13/428* (2014.09); *A63F 13/211* (2014.09); *A63F 13/25* (2014.09); *A63F 2300/8082* (2013.01)

(58) Field of Classification Search
CPC ...... A63F 13/428; A63F 13/211; A63F 13/25; A63F 2300/8082; G06F 2203/012; G06F 3/011
See application file for complete search history.

(56) References Cited

U.S. PATENT DOCUMENTS 5,345,281 A * 9/1994 Taboada ................. A61B 3/113
351/209
5,490,784 A * 2/1996 Carmein .................. G09B 9/12
434/365

(Continued)

FOREIGN PATENT DOCUMENTS

WO    9935559 A2    7/1999

OTHER PUBLICATIONS

Frank Biocca, "Virtual Reality Technology: A Tutorial", Journal of Communication, vol. 42, No. 4, Dec. 31, 1992, pp. 23-72, Chapel Hill, University of North Carolina.

(Continued)

*Primary Examiner* — Seng H Lim
(74) *Attorney, Agent, or Firm* — Dickinson Wright PLLC (57) ABSTRACT

A system for simulating an output in a virtual reality gaming environment including a pod for being entered by a user. A virtual reality device is located in the pod for being worn by the user. A controller unit is electrically connected with the virtual reality device and the pod and defines an electronic three-dimensional grid representative of the pod. At least one motion sensor is electrically connected to the controller unit for detecting movement within the pod and providing the controller unit input data. The input data includes three-dimensional coordinates representative of a location of the detected movement in the pod. At least one output device is disposed in the pod and electrically connected with the controller unit. The controller unit receives the input data and activates the output device at three-dimensional coor- (Continued)

dinates in the pod that correspond with the three-dimensional coordinates of input data.

5 Claims, 4 Drawing Sheets

(56) References Cited

U.S. PATENT DOCUMENTS

| | | | | |
|---|---|---|---|---|
| 5,980,256 | A * | 11/1999 | Carmein | G09B 9/165 |
| | | | | 482/902 |
| 6,563,489 | B1 * | 5/2003 | Latypov | G09B 9/00 |
| | | | | 345/164 |
| 8,295,529 | B2 * | 10/2012 | Petersen | H04R 1/083 |
| | | | | 381/374 |
| 9,153,195 | B2 * | 10/2015 | Geisner | G06F 3/012 |
| 9,755,848 | B2 * | 9/2017 | Cieszkowski, III | H04L 51/043 |
| 9,996,153 | B1 * | 6/2018 | Trotta | G06F 3/016 |
| 10,449,445 | B2 * | 10/2019 | Brav | A63F 13/285 |
| 10,582,328 | B2 * | 3/2020 | Milevski | H04S 7/304 |
| 10,698,492 | B2 * | 6/2020 | Daniels | G06F 1/163 |
| 11,030,806 | B2 * | 6/2021 | Bretschneider | A63F 13/69 |
| 11,273,344 | B2 * | 3/2022 | Zets | A61B 5/486 |
| 11,308,654 | B2 * | 4/2022 | Li | G06F 1/28 |
| 2012/0206452 | A1 * | 8/2012 | Geisner | G06V 10/26 |
| | | | | 345/419 |
| 2013/0083018 | A1 * | 4/2013 | Geisner | G06F 3/011 |
| | | | | 345/633 |
| 2013/0162632 | A1 * | 6/2013 | Varga | H04N 13/383 |
| | | | | 345/419 |
| 2013/0342564 | A1 * | 12/2013 | Kinnebrew | G09G 3/003 |
| | | | | 345/619 |
| 2014/0098126 | A1 * | 4/2014 | Fein | G06F 3/011 |
| | | | | 345/633 |
| 2014/0364228 | A1 * | 12/2014 | Rimon | A63F 13/86 |
| | | | | 463/32 |
| 2015/0105129 | A1 * | 4/2015 | Chapman | A63F 13/212 |
| | | | | 463/7 |
| 2015/0331483 | A1 * | 11/2015 | Cieszkowski, III | G06F 3/011 |
| | | | | 345/156 |
| 2016/0275722 | A1 * | 9/2016 | Bretschneider | A63F 13/323 |
| 2017/0108929 | A1 * | 4/2017 | Sinko | G06F 3/016 |
| 2017/0109131 | A1 * | 4/2017 | Boesen | H04R 1/1091 |
| 2017/0165567 | A1 * | 6/2017 | Walters | A63F 13/285 |
| 2017/0278306 | A1 * | 9/2017 | Rico | G02B 27/0093 |
| 2018/0095534 | A1 * | 4/2018 | Omote | G02B 27/017 |
| 2018/0124497 | A1 * | 5/2018 | Boesen | H04W 4/025 |
| 2018/0161671 | A1 * | 6/2018 | Heubel | A63F 13/212 |
| 2018/0181198 | A1 * | 6/2018 | Trotta | G06F 3/016 |
| 2018/0232800 | A1 * | 8/2018 | Mattingly | G06F 3/011 |
| 2019/0099667 | A1 * | 4/2019 | Chida | G06T 19/003 |
| 2019/0232113 | A1 * | 8/2019 | Zets | A61B 5/1128 |
| 2019/0283247 | A1 * | 9/2019 | Chang | G05B 17/02 |
| 2019/0291277 | A1 * | 9/2019 | Oleynik | B25J 9/1697 |
| 2019/0365594 | A1 * | 12/2019 | Geisinger | G06F 3/01 |
| 2019/0380638 | A1 * | 12/2019 | Wright | A61B 5/4023 |
| 2020/0093679 | A1 * | 3/2020 | Sonar | G01L 5/228 |
| 2020/0111451 | A1 * | 4/2020 | Francies, III | A63F 13/5255 |
| 2021/0271326 | A1 * | 9/2021 | Hinchet | G06F 3/016 |
| 2022/0203225 | A1 * | 6/2022 | Jain | A63F 13/25 |

OTHER PUBLICATIONS

International Search Report and Written Opinion of the International Searching Authority for International Application No. PCT/US2019/053786 dated Dec. 19, 2019, 11 pages.

* cited by examiner

SYSTEM FOR SIMULATING AN OUTPUT IN A VIRTUAL REALITY ENVIRONMENT

CROSS-REFERENCE TO RELATED APPLICATIONS

This application is a National Stage of International Application No. PCT/US2019/053786 filed Sep. 30, 2019, titled "System for Simulating Output in a Virtual Reality Environment", which claims priority to U.S. Provisional Patent Application Ser. No. 62/738,398 filed on Sep. 28, 2018, titled "Virtual Reality Gaming Suit for Providing Physical Feedback to Users", the entire disclosures of which are hereby incorporated by reference.

TECHNICAL FIELD

The present disclosure relates generally to virtual reality environments, such as gaming environments. More particularly, the present disclosure relates to a system for simulating an output in a virtual reality gaming environment.

BACKGROUND OF THE DISCLOSURE

The Internet has spawned a wide variety of forms of entertainment, including video games. Among these games are virtual reality games that immerse a user or users in a virtual world. The virtual world may have varying levels of interactivity, from simply viewing objects to interacting with them. Additionally, the virtual world may allow for a user to interact with other users, either together on a team or against some or all of the other users in the virtual reality game.

Gaming products are being developed that use both software and firmware (e.g., microcode) to further expand the scope of virtual reality gaming. Computer system developers are preparing more realistic virtual reality simulations so as to mimic the real world in virtual reality. To accomplish the ever more realistic virtual reality, software, firmware and hardware devices may be configured to operate together to simulate a user's senses and create sensory illusions to match the interactions within the virtual reality gaming environment generated by the computer system.

Vision and sound have been included by these systems in generating a virtual reality environment. Such peripherals as virtual reality and/or augmented reality helmets can provide a user with realistic virtual vision simulations and also include speakers for virtual hearing in the virtual reality environment. There remains a need for continued improvements to virtual reality gaming systems.

SUMMARY OF THE DISCLOSURE

It is therefore an aspect of the present disclosure to provide a system and method that provides a more realistic virtual reality gaming environment/experience through a virtual reality device, such as a suit, that allows for realistic movement and stimulates senses such as touch, smell and taste of the user. It is another aspect of the disclosure to provide a virtual reality device, such as a suit, that measures the movements of the user and generates simulated movements in the virtual reality environment.

In accordance with these and other aspects of the disclosure, a system for simulating an output in a virtual reality gaming environment is provided. The system includes a pod for being entered by a user. A virtual reality device is located in the pod for being worn by the user. A controller unit is electrically connected with the virtual reality device and the pod. The controller unit defines an electronic three-dimensional grid representative of the pod. At least one motion sensor is electrically connected to the controller unit for detecting movement within the pod and providing the controller unit with input data associated with the detected movement. The input data includes three-dimensional coordinates within the electronic three-dimensional grid representative of a location of the detected movement in the pod. At least one output device is disposed in the pod and electrically connected with the controller unit. The controller unit is configured to receive the input data from the at least one motion sensor and to activate the output device at three-dimensional coordinates in the pod that correspond with the three-dimensional coordinates of input data acquired by the motion sensor.

It is also an aspect of the disclosure to provide a system and method that allows multiple users to wear the virtual reality device and interact with each other within the virtual reality environment. The virtual reality gaming suit may be configured to permit users to interact with each other by hitting each other, shooting each other, touching each other, carrying each other, and other physical contact within the virtual reality environment.

According to these, and other aspects of the disclosure, a system for simulating a presence between at least a first user at a first location and a second user at a second location is provided. The system includes a first pod at the first location for being entered by the first user. A first controller unit is electrically connected with the first pod for receiving inputs and emitting outputs to the first pod. The first controller unit defines an electronic three-dimensional grid representative of the first pod. At least one first motion sensor is electrically connected to the first controller unit for detecting movement within the first pod and providing the first controller unit input data associated with the detected movement. The input data includes coordinates within the electronic three-dimensional grid representative of the detected movement. At least one first output device is disposed in the first pod and is electrically connected with the first controller unit for selectively being activated. A second pod is at the second location for being entered by the second user. A second controller unit is electrically connected with the second pod for receiving inputs and emitting outputs. The second controller unit defines an electronic three-dimensional grid representative of the second pod. At least one second motion sensor is disposed in the second pod and is electrically connected to the second controller unit for detecting movement within the second pod and providing the second controller unit with input data associated with the detected movement. The input data includes three-dimensional coordinates within the electronic three-dimensional grid representative of the detected movement. At least one second output device is disposed in the second pod and is electrically connected with the second controller unit for selectively being activated. A mainframe is electrically connected with the first and second controller units and configured to receive the input data from the first and second controller units. The mainframe is configured to provide instructions to the first control unit to activate the first output device at three-dimensional coordinates in the first pod that correspond with the three-dimensional coordinates of the input data acquired by the second motion sensors, and configured to provide instructions to the second control unit to activate the second output device at three-dimensional coordinates in the second pod that correspond with the three-dimensional coordinates of the input data acquired by the first motion sensors.

It is a further aspect of the disclosure to provide a system and method that includes an improved virtual reality helmet as a component of the virtual reality suit that includes eye tracking of the user. The eye tracking of the user may include orienting the user in the virtual reality environment, providing scent (smell) feedback. The helmet also includes tactile elements to simulate touch in the virtual reality environment and also includes heating and cooling elements to simulate changing weather conditions in the virtual reality environment.

It is also an aspect of the disclosure to provide a system and method that includes a virtual reality gaming suit with tactile simulation materials, such as haptic feedback. The haptic feedback of the virtual reality gaming suit may include rumble motion packs, air ballasts or bladders. The suit may also include a thermal application device such as heat and cooling elements. The suit may also include an electric or magnetic impulse device for transmitting magnetic or electromagnetic impulses (shocks) that may be perceived by the user. The suit may also include a sound device, such as speakers, that may emit audible sounds to the user(s).

It is another aspect of the disclosure to provide a system and method that includes a virtual reality gaming suit configured as an exoskeleton. The exoskeleton may cover some or all of the user, depending upon the virtual reality gaming environment or a modularity of the exoskeleton. The exoskeleton may be configured to be flaccid (limp) until energized by the virtual reality gaming environment. The energizing (activation) may be provided by electrical current, magnetic field, or another activation system. The exoskeleton may be configured with motion tracking and/or motion capture sensors and devices. The exoskeleton may be configured to operate with another virtual reality gaming suit, such as being worn on top of the other virtual reality gaming suit. The exoskeleton may be configured to provide haptic or force feedback based on the virtual reality environment.

It is a further aspect of the disclosure to provide a system and method that includes a virtual reality gaming suit with one or more user orientation systems. The user orientation systems may include intaoral or vestibular prosthesis devices, ear canal devices that may, upon insertion in, or upon being positioned near the ear canal(s) or head of the user, provide stabilizing (or destabilizing) sensations to the user relative to the virtual reality environment. The user orientation system may be configured to maintain the balance of the user when wearing the user orientation system of the virtual reality gaming suit. The user orientation system may be configured to provide active feedback to the user and to include a plurality of modes depending upon the user and/or the virtual reality gaming environment.

It is another aspect of the disclosure to provide a system and method that includes a virtual reality gaming suit with a locomotion device. The locomotion device may be configured to allow the user wearing the virtual reality gaming suit to simulate movement, such as walking, running, and other physical movements that may be translated to the virtual reality environment through the Motion capture elements included virtual reality gaming suit.

It is another aspect of the disclosure to provide a system and method that includes a virtual reality gaming suit that is configured to simulate weapons and other physical contact from within the virtual reality environment. For example, the virtual reality gaming suit may be configured, together with the virtual reality gaming environment, to permit a user to pick up objects within the virtual reality environment and feel the weight of the object (such as a sword) through the virtual reality gaming suit. A replica sword may be included with (connected to) the virtual reality gaming suit that permits the user to move the replica sword in the actual environment but wearing the virtual reality gaming suit, the movements of the replica sword are duplicated in the virtual reality environment. Similarly, another user in the virtual reality environment may, using another sword for example, swing the sword toward the user and strike the user. The user, wearing the virtual reality gaming suit as described herein, feels the impact transmitted by the virtual reality gaming suit to the user, enhancing the experience of the virtual reality environment.

It is another aspect of the disclosure to provide a system and method that includes a virtual reality gaming suit with a flying simulation device. The flying simulation device may be configured as a seat or on another device that is configured to simulate the movement of flight in three dimensions. The virtual reality gaming suit may be configured with the flying simulation device or may be configured to operate as the flying simulation device. For example, the user wearing the virtual reality gaming suit may move the upper body of the user in various directions to direct flying in the virtual reality environment. Leaning forward may direct flight downward, leaning backward may direct flight upward, etc.

According to the above and other aspects of the present disclosure, a system and method for a realistic virtual reality gaming environment through a virtual reality gaming suit or head mounted display (HMD) that allows for realistic movement and includes at least one of the senses of touch, smell and taste of the user is provided as shown and described.

U.S. Pat. No. 9,755,848 to the Applicant is hereby incorporated by reference in its entirety.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

The present disclosure relates to a system and method for allowing real time user exchanged bio feedback through a virtual reality network that is based on the movements and sensory perception of each user. According to an aspect, the system and method can be employed by one, or multiple users located in different locations, such that they are at separate and remote locations. According to another aspect, the system and method can be employed by users in different parts of the same location. Additionally, the system and method can accommodate any number of users at any combination of locations.

Figure 1:
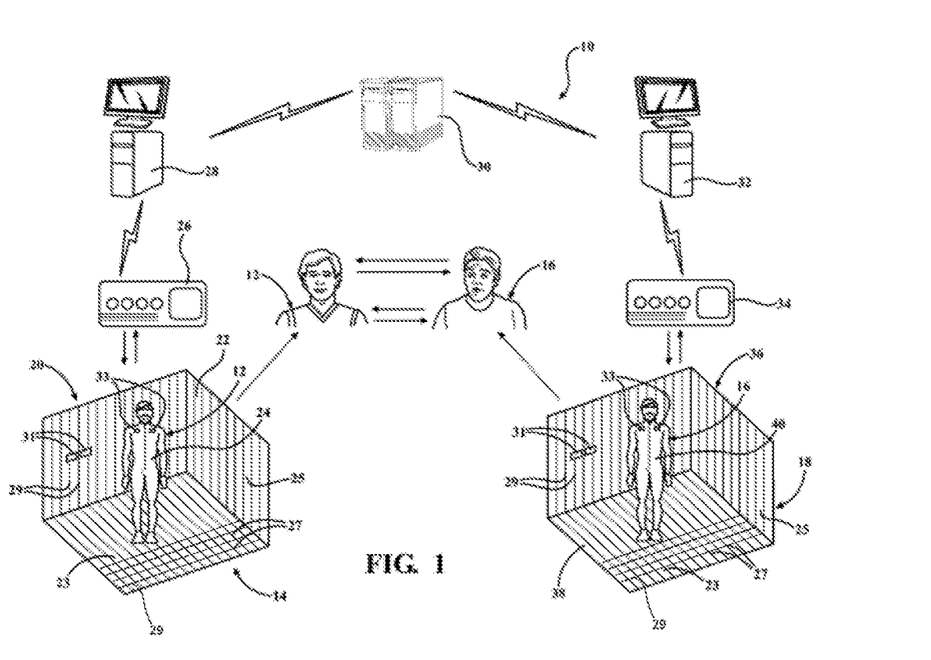
FIG. 1 is a schematic illustration of a bio feedback virtual reality system in accordance with an aspect of the disclosure.

According to an aspect, the system 10 can generally include a first user 12 disposed at a first location 14 and a second user 16 disposed at a second location 18. It should be appreciated that the system may accommodate additional users and locations.

The first user 12 may be in communication with a first environment 20. According to another aspect, the first environment 20 can include a first pod 22 and a first user suit 24 that cooperate to create a virtual reality experience. In an exemplary aspect, the first pod 22 is a first grid centric pod 22 that includes a floor 23 and four walls 25. The walls 25 extend perpendicularly to the floor 23. A first three-dimensional grid is defined in the pod 22. The three-dimensional grid is defined by a plurality of first horizontal axes 27 that extend parallel to the floor 23, a plurality of second horizontal axes 29 that extend perpendicularly to the first horizontal axes 27 and parallel to the floor, and a plurality of vertical axes 29 that extend parallel to the walls 25.

According to a further aspect, each of the first grid centric pod 22 and the first user virtual reality gaming suit 24 may be in communication with a first controller unit 26 that is configured to receive inputs from, and emit outputs to the first virtual environment 20. Furthermore, the first controller unit 26 may define the first grid electronically, thus providing an electronic three-dimensional grid representative of the first grid of the first pod 22. Said another way, the first controller unit 26 may establish an electronic version of the first pod 22 that has electronic dimensions that correlate with the physical first pod 22 such that actions that occur in the physical first pod 22 may be tracked and entered into/displayed within the electronic first three-dimensional grid.

According to an aspect, the first environment 20 cooperates to register inputs in the form of user movements, actions, and sensory perceptions as captured by input sensors 31 disposed the first environment 20 and provide input data captured from the input sensors 31 to the first controller unit 26. Based on the input data, the first controller unit 26 is configured to create a predetermined output at the location of the captured input, or capture and mirror the inputs to allow them to be simulated at another location. These user inputs can be physical movements alone or can be coupled with inputs in the form of other sensory inputs. According to an aspect, the first user virtual reality gaming suit 24 together with the first grid centric pod 22 can create the simulation of a human's presence. In an exemplary aspects, the input sensors 31 include a plurality of motion sensors 31 that provide the first controller unit 26 with three-dimensional coordinates of the location of the first user suit virtual reality gaming suit 24 (or other devices) within the first centric pod 22. According to another aspect, different or additional input sensors 31 may be utilized to capture the first user's 12 movements and senses. According to a further aspect, an exemplary sensory input device can include aa VIVE™ device from HTC™, an oculus Rift™ device, such as has been promoted by Google™, Inc., in combination with, or separate from, accelerometers, other motion sensors, light sensors, laser grid technology, and physical energy sleeves (NASA™).

According to an aspect, the pod 22, 38, the first user virtual reality gaming suit 24, or other virtual reality device, such as a headset, may be rigged with, a variety of output devices 33 to assist with detecting and providing human movements and sensory feedback, including air ballasts, electric impulse emitters, vibrators, dummies, thermal manipulation and smell emitting devices. It will be appreciated that a variety of other output devices 33 and input devices may be employed. Any suitable virtual reality suit may be employed. Exemplary suitable virtual reality components can include a RTT pinch Glove™, VRgluc™, other fourth generation haptic technologies, ultra sound waves, haptic teleportation, electric impulse emitters and the like.

According to a further aspect, the first grid centric pod 22 can work with the first user virtual reality gaming suit 24 and an output device 33 such as a robotic dummy to simulate user presence and user senses. Furthermore, the input sensors 31 may be configured to detect movement of objects other than the user, such as the robotic dummy. According to this aspect, dummy parts of various sizes can be utilized to form the appropriate size of the human in the experience to provide a more accurate and realistic experience. Other possible pod technologies could be smell, sound, and various haptic systems. According to an aspect, the first pod 22 may also include a stepping system, such as on the floor 23 thereof that will allow for user movement and tracking therefore in the virtual space. According to a further aspect, a user house could serve as a pod 22, 38. As used herein, a pod 22, 38 may be any structure that uses output devices to project the experience to the user.

According to an aspect, the first controller unit 26 may be in communication with a first application server 28. According to an aspect, the first application server 28 may be configured to establish a network communication with a main server, referred to herein as a hyper haptic server mainframe, as generally designated by reference number 30. The communication between the first controller unit 26 and the hyper haptic mainframe 30 can be accomplished via a broadband communication over the Internet. It will be appreciated that communication can also be accomplished by a wireless or Wi-Fi communication or cellular connection.

According to another aspect, the hyper haptic mainframe 30 can communicate with a second application server 32 associated with the second user 16 at the second location 18. The second application server 32 may be in communication with a second controller unit 34 that is in communication with a second environment 36. The hyper haptic mainframe 30 may also communicate with a third, fourth or any number of application servers associated with other users at other locations (that are configured in the same or similar manner). According to an aspect, the second environment 36 can consist of a second pod 38, e.g., second grid centric pod 38, and a second user suit 40 that cooperate to create a virtual reality environment. The second grid centric pod 38 and the second user suit 40 may have the same configuration as those discussed above in connection with the first environment 20. Each of the second grid centric pod 38 and the second user suit 40 can communicate with the second controller unit 34 to receive inputs from and emit outputs to the second virtual environment 36 in the same fashion as discussed above in connection with the first environment 20. According to an aspect, the second environment 36 can cooperate to register inputs in the form of user movements and actions and input those to the second controller unit 34 in the form of three-dimensional coordinates. These user inputs can be physical movements alone or can be coupled with inputs in the form of other sensory inputs. The second user suit 40 together with the second grid centric pod 38 can create the simulation of a human's presence. The second environment 36 can be configured to operate the same as the first environment 20 with the same components. According to another aspect, the components and operation of each environment may be different.

It will also be appreciated that while the term human has been utilized in connection with the description of the aspects above, the system can also be utilized with other living beings such as pets or animals. An exemplary system can include a pet home monitoring system. Other interactive 40 applications can also be simulated.

According to a still further aspect and as generally described in the preceding, the virtual space/room can be set up grid style, such that the user's pod 22, 38 and the grid overlap can give the suit a virtual outline presence. The virtual space/room can be hosted on the presence mainframe. In operation, as the user 12, 26 moves on the grid in his box, he can also move on the virtual box grid, which is how the proximity of the user to other avatars can be determined. The pod 22, 38 and virtual reality gaming suits 24, 40 may coordinate together to simulate the sense of touch using haptic and physical feedback technologies. According to a more specific aspect, the motion sensor(s) of the first pod 22 may provide the first controller unit with three-dimensional coordinates of the location of the first user virtual reality gaming suit 24 (or other object) within the first grid, and the motion sensor of the second pod 38 may provide the second controller unit with three-dimensional coordinates of the location of the second user suit 40 (or other object) within the second grid to activate the output devices 33 on the first and second user virtual reality gaming suits 24, 40 at locations that correspond with the detected three-dimensional coordinates. Thus, for example, the motion sensors in the first pod 22 could detect the location of the first user's 12 arm during movement thereof and thus an output device 33 in the second pod 38 is activated at the same coordinate locations in the second pod 38 to simulate the movement of the arm of the first user 12 to the second user 16. It should be appreciated that any number of motion sensors could be used to detect the position of any number of areas of the first and second user virtual reality gaming suits 24, 40. Additionally, it should be appreciated that the input sensors 31 and output devices may be configured to be synced with each other such that movements (or other inputs) can be captured and replicated substantially in real time. Furthermore, it should be appreciated that any number of other types of sensors, e.g., a scent detector, and output devices, e.g., a scent emitter, could be used in the same way as described herein.

Thus according to an aspect, in operation the user 12, 16 can start by putting on the virtual reality gaming suit 24, 40 (or other virtual reality device such as a headset with a graphical user interface) and entering the pod 22, 38. Once situated, the pod 22, 38 and virtual reality gaming suit 24, 40 can sync up in order to create an experience. The movements of the user 12, 16 may be translated into a digitally virtual room where they are able to see other users around them. As this "chat room" has more people enter it through the Internet, those people are able to interact with each other and feel the sensations of each other's physical presence, i.e., handshake, hug, etc. This technology is designed to simulate the concept of teleportation.

Figure 2:
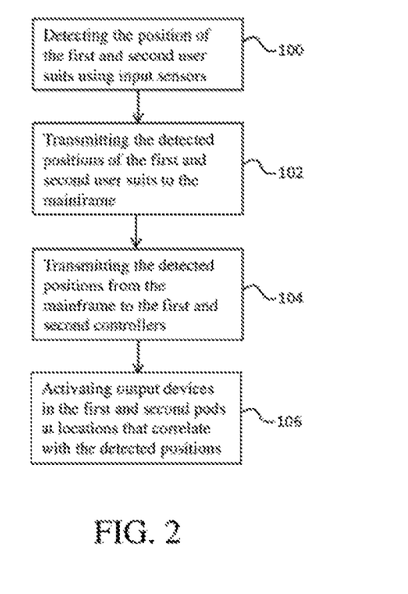
FIG. 2 is a flow diagram of a method of simulating a presence between a first user in a first pod at a first location and a second user in a second pod at a second location in accordance with an aspect of the disclosure.

According to a further aspect of the disclosure, a method for simulating a presence between a first user 12 in a first pod 22 at a first location and a second user 16 in a second pod 38 at a second location is provided. As best presented in FIG. 2, the method includes 100 detecting a position of at least part of a first user virtual reality gaming suit 24 in the first pod 22 using an input sensor 31, and detecting a position of at least part of a second user virtual reality gaming suit 40 in the second pod 38 using an input sensor 31. It should be appreciated that any number of input sensors 31 could be utilized and the input sensors 31 could be positioned at various locations in the first and second pods 22, 38 at various locations on the first and second user virtual reality gaming suits 24, 40. The method proceeds by 102 electronically transmitting the detected position of the first user virtual reality gaming suit 24 to a mainframe 30, and electronically transmitting the detected position of the second user suit 40 to the mainframe 30. The method continues with 104 electronically transmitting the detected position of the first user suit 24 from the mainframe 30 to a second controller 34 that is electronically connected with the second pod 38 and the second user virtual reality gaming suit 40, and electronically transmitting the detected position of the second user virtual reality gaming suit 40 from the mainframe 30 to a first controller 26 that is electronically connected with the first pod 22 and the first virtual reality gaming suit 24. Furthermore, the method includes 106 activating an output device 33 disposed in the second pod 38 at a location that correlates with the detected position of the first user virtual reality gaming suit 24 with the second controller 34, and activating an output device 31 disposed in the first pod 38 at a location that correlates with the detected position of the second user virtual reality gaming suit 40 with the first controller 26.

Figure 3:
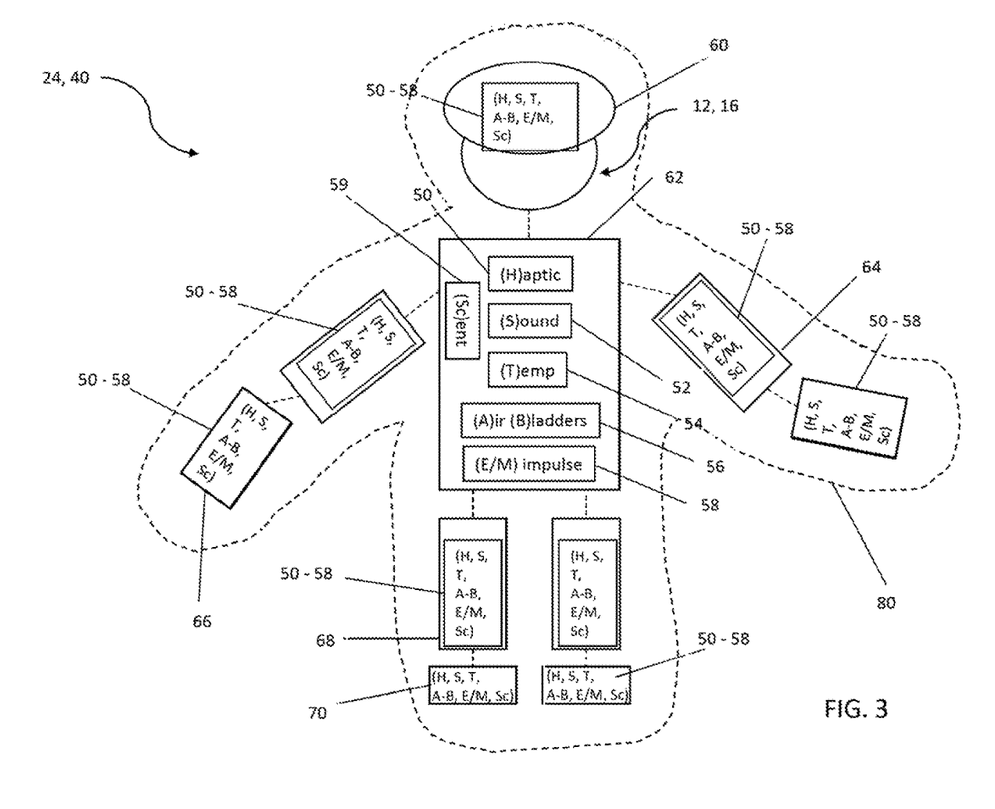
FIG. 3 is a block diagram of a virtual reality gaming suit in accordance with an aspect of the disclosure.

According to another aspect, a virtual reality gaming suit 24, 40 is shown in FIG. 3. The virtual reality gaming suit 24, 40 may include a plurality of virtual reality augmenting devices 50-58 to provide the user 12, 16 with a virtual reality experience. A haptic feedback device 50 may be configured to provide the user 12, 16 with tactile feedback based on actions taken or received in a virtual reality environment. The haptic feedback device 50 may include, for example, rumble packs, air ballasts or bladders, or other mechanical devices to apply force (force-feedback) to the user 12, 16 through the virtual reality gaming suit 24, 40.

A sound device 52 may be configured to provide the user 12, 16 with audio feedback based on actions taken or received in a virtual reality environment. The sound device 52 may include, for example, speakers that may be configured to project sound at some or all parts of the body of the user 12, 16 via the virtual reality gaming suit 24, 40. For example, a low bass sound may be projected toward the user 12, 16 through the virtual reality gaming suit 24, 40 when an explosion occurs within the virtual reality environment in proximity to the user 12, 16.

A thermal application device 54 may be configured to provide the user 12, 16 with temperature feedback based on actions taken or received in a virtual reality environment. The thermal application device 54 may include thermal devices (heating and cooling devices) that may be configured to heat or cool some or all of the user 12, 16 via the virtual reality gaming suit 24, 40. For example, the thermal application device 54 may be configured in the virtual reality gaming suit 24, 40 to change the temperature of the virtual reality gaming suit 24, 40 worn by the user 12, 16 when the user within the virtual reality environment, steps from a warm building to snowstorm outside.

An air bladder device 56 may be configured to provide the user 12, 16 with pressure feedback based on actions taken or received in a virtual reality environment. The air bladder device 56 may include one or more air pumps disposed in the virtual reality gaming suit 24, 40. The air pumps may inflate or deflate the air bladders in the virtual reality gaming suit 24, 40 to provide the user 12, 16 with the feeling of pressure applied or received. For example, in a virtual reality football game, if the user 12, 16 is tackled, the virtual reality gaming suit 24, 40, through at least the air bladder device 56, can apply a force to the user 12, 16 to simulate an impact of one or more football players against the user 12, 16.

An electrical/magnetic impulse device 58 may be configured to provide the user 12, 16 with electrical/magnetic feedback based on actions taken or received in a virtual reality environment. The E/M impulse device 58 may be configured to emit an E/M impulse to the user 12, 16 via the virtual reality gaming suit 24, 40. For example, the user 12, 16 may be in a magic-based virtual reality environment and be subjected to a magic spell in the form of an E/M impulse. The E/M impulse device 58 can subject the user 12, 16 to an E/M impulse via the virtual reality gaming suit 24, 40.

According to an aspect, the virtual reality gaming suit 24, 40 may be configured with a plurality of components, such as a helmet 60, a torso 62, a pair of arms 64, a pair of hands 66, a pair of legs 68, and a pair of feet 70. Additionally and alternatively, the some or all of the plurality of components may configured in a single bodysuit encompassing the user 12, 16. It is anticipated that the plurality of components may be used separately or in a number of combinations, up to and including all of the plurality of components.

Figure 4:
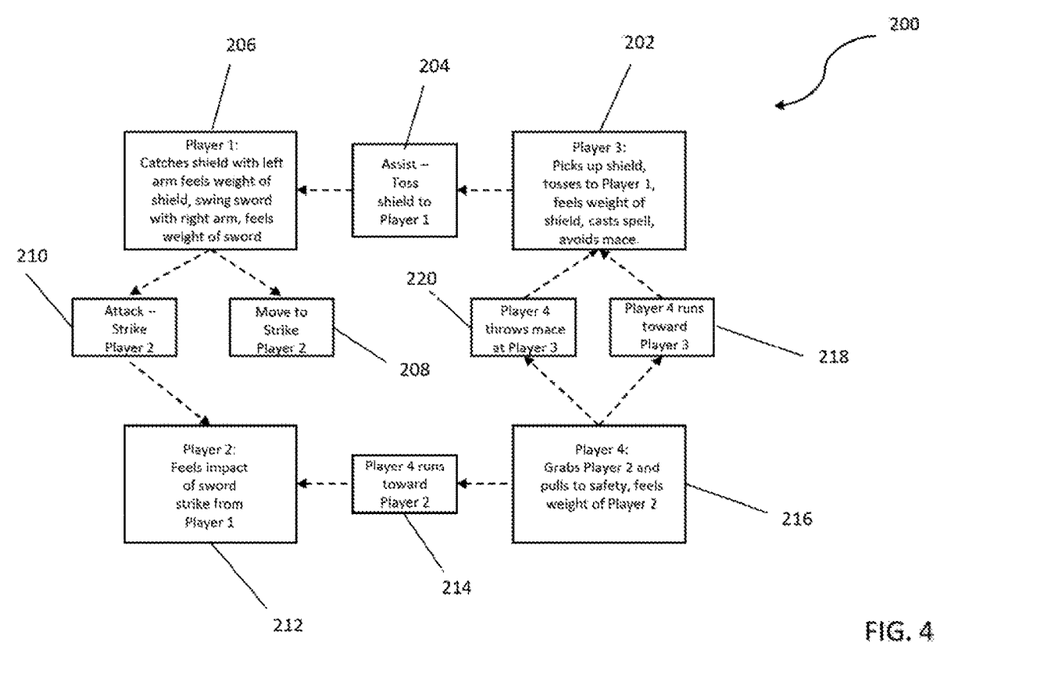
FIG. 4 is a flow diagram of a simulated virtual reality sequence involving multiple players each wearing a virtual reality gaming suit in accordance with an aspect of the disclosure.

According to an aspect, the virtual reality gaming suit 24, 40 may be configured to provide the user 12, 16 with multiplayer interactions 200 using the virtual reality augmenting devices 50-58, such as those described in the flowchart of FIG. 4. While these steps are described linearly, it should be understood that these steps may also occur simultaneously or nearly simultaneously in a virtual reality environment. In step 202, Player 3 can pick up a shield in the virtual reality environment, feel its weight due to the virtual reality augmenting devices 50-58, throw the shield to Player 1, casts a magic spell (feeling electrical impulses) and ducks to avoid a mace thrown by Player 4. In step 204, the shield travels through the virtual reality environment from Player 3 to Player 1. In step 206, Player 1 catches the shield with a left arm, feels its weight, swings a sword held in a right arm toward Player 2, feeling the weight of the sword. In steps 208 and 210, Player 1 moves toward Player 2 (runs, walks) and then attacks Player 2 with the sword. In step 212, Player 2 feels the impact of the sword via the virtual reality augmenting devices 50-58. In step 214, Player 4 runs toward Player 2 to assist. In step 216, Player 4 grabs Player 2 (Player feeling the grabbing pressure) and pulls Player 2 to safety. In step 218, Player 4 runs toward Player 3 and in step 220, Player throws a mace at Player 3.

According to an aspect, the virtual reality gaming suit 24, 40 may be configured to provide the user 12, 16 with multiplayer interactions that may include hitting one another or other objects, shooting one another or other objects, hugging one another, carrying one another or other objects, dancing with one another, and engaging in fighting/combat with one another or other objects.

According to an aspect, the virtual reality gaming suit 24, 40 may be configured to provide the user 12 with the capability to create inputs that generally infiltrate the virtual space of the user 16's avatar, whether through direct virtual contact or using a virtual implement to carry out that contact, therefore activating output devices in the virtual reality environment in the general vicinity of and on the user 16, and similarly for user 16 relative to user 12.

Referring now to FIG. 3, according to an aspect, the virtual reality gaming suit 24, 40 may be configured to provide the user 12, 16 with an improved helmet 60 that may include a head mounted display (HMD). The helmet 60 can include tracking of the eye movement of users 12, 16. The tracking can be used to orient the user in a virtual reality environment. The helmet 60 can include scent feedback using scent generators 59 that are configured to release scents according to the virtual reality environment. The scent generators 59 may be configured as replaceable/changeable cartridges depending upon the particular virtual reality environment (football, battle). The helmet 60 can include a tactile mask to apply force to the head of the user 12, 16 including the face and other parts of the head. The helmet 60 can include sound devices 52 to provide sound to the user 12, 16. The helmet 60 can include thermal application devices 54 to vary the temperature of the user 12, 16 depending on the virtual reality environment. The helmet 60 can include air bladders 56 to apply force to the user 12, 16. The helmet 60 can include E/M devices 58 to provide impulses to the head of the user 12, 16.

According to an aspect, the virtual reality gaming suit 24, 40 may be configured to provide the user 12, 16 with an improved torso 62 that may include scent feedback using scent generators 59 that are configured to release scents according to the virtual reality environment. The scent generators 59 may be configured as replaceable/changeable cartridges depending upon the particular virtual reality environment (football, battle). The torso 62 can include a haptic devices 50 to apply force to the torso of the user 12, 16. The torso 62 can include sound devices 52 to provide sound to the user 12, 16. The torso 62 can include air bladders to apply pressure to the user 12, 16. The torso 62 can include thermal application devices 54 to vary the temperature of the user 12, 16 depending on the virtual reality environment. The torso 62 can include air bladders 56 to apply force to the user 12, 16. The torso 62 can include E/M devices 58 to provide impulses to the user 12, 16.

According to an aspect, the virtual reality gaming suit 24, 40 may be configured to provide the user 12, 16 with arms 64 that may include scent feedback using scent generators 59 that are configured to release scents according to the virtual reality environment. The scent generators 59 may be configured as replaceable/changeable cartridges depending upon the particular virtual reality environment (football, battle). The arms 64 can include a haptic devices 50 to apply force to the torso of the user 12, 16. The arms 64 can include sound devices 52 to provide sound to the user 12, 16. The arms 64 can include thermal application devices 54 to vary the temperature of the user 12, 16 depending on the virtual reality environment. The arms 64 can include air bladders 56 to apply pressure/forces to the user 12, 16. The arms 64 can include E/M devices 58 to provide impulses to the user 12, 16.

According to an aspect, the virtual reality gaming suit 24, 40 may be configured to provide the user 12, 16 with hands 66 that may include scent feedback using scent generators 59 that are configured to release scents according to the virtual reality environment. The scent generators 59 may be configured as replaceable/changeable cartridges depending upon the particular virtual reality environment (football, battle). The hands 66 can include a haptic devices 50 to apply force to the torso of the user 12, 16. The hands 66 can include sound devices 52 to provide sound to the user 12, 16. The hands 66 can include air bladders to apply pressure to the user 12, 16. The hands 66 can include thermal application devices 54 to vary the temperature of the user 12, 16 depending on the virtual reality environment. The hands 66 can include air bladders 56 to apply force to the user 12, 16. The hands 66 can include E/M devices 58 to provide impulses to the user 12, 16.

According to an aspect, the virtual reality gaming suit 24, 40 may be configured to provide the user 12, 16 with legs 68 that may include scent feedback using scent generators 59 that are configured to release scents according to the virtual reality environment. The scent generators 59 may be configured as replaceable/changeable cartridges depending upon the particular virtual reality environment (football, battle). The legs 68 can include a haptic devices 50 to apply force to the torso of the user 12, 16. The legs 68 can include sound devices 52 to provide sound to the user 12, 16. The legs 68 can include air bladders to apply pressure to the user 12, 16. The legs 68 can include thermal application devices 54 to vary the temperature of the user 12, 16 depending on the virtual reality environment. The legs 68 can include air bladders 56 to apply force to the user 12, 16. The legs 68 can include E/M devices 58 to provide impulses to the user 12, 16.

According to an aspect, the virtual reality gaming suit 24, 40 may be configured to provide the user 12, 16 with feet 70 that may include scent feedback using scent generators 59 that are configured to release scents according to the virtual reality environment. The scent generators 59 may be configured as replaceable/changeable cartridges depending upon the particular virtual reality environment (football, battle). The feet 70 can include a haptic devices 50 to apply force to the torso of the user 12, 16. The feet 70 can include sound devices 52 to provide sound to the user 12, 16. The feet 70 can include air bladders to apply pressure to the user 12, 16. The feet 70 can include thermal application devices 54 to vary the temperature of the user 12, 16 depending on the virtual reality environment. The feet 70 can include air bladders 56 to apply force to the user 12, 16. The feet 70 can include E/M devices 58 to provide impulses to the user 12, 16.

According to an aspect, the virtual reality gaming suit 24, 40 may be configured to include or in addition to include an exoskeleton 80 (see FIG. 3). The exoskeleton 80 can be configured to cover some or all of the virtual reality gaming suit 24, 40. The exoskeleton 80 can be flaccid until activated, such as by electric current via the virtual reality environment. The exoskeleton 80 can include motion tracking devices and/or motion capture devices. The exoskeleton 80 can be configured to be worn on top of the virtual reality gaming suit 24, 40. The exoskeleton 80 can be configured to provide force feedback with the virtual reality gaming suit 24, 40 or in addition to the virtual reality gaming suit 24, 40.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the aspects described herein are intended to provide a general understanding of the structure of the various aspects. The specification and illustrations are not intended to serve as an exhaustive and comprehensive description of all of the elements and features of apparatus and systems that use the structures or methods described herein. Many other aspects may be apparent to those of skill in the art upon reviewing the disclosure. Other aspects may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate aspects, may also be provided in combination in a single aspect. Conversely, various features that are, for brevity, described in the context of a single aspect, may also be provided separately or in any sub combination. Further, reference to values stated in ranges includes each and every value within that range.

Benefits, other advantages, and solutions to problems have been described above with regard to specific aspects. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other aspects that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although only a few exemplary aspects have been described in detail above, those skilled in the art will readily appreciate that many modifications are possible in the exemplary aspects without materially departing from the novel teachings and advantages of the aspects of the present disclosure. Accordingly, all such modifications are intended to be included within the scope of the aspects of the present disclosure as defined in the following claims. In the claims, means-plus-function clauses are intended to cover the structures described herein as performing the recited function and not only structural equivalents, but also equivalent structures.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A system for simulating a presence between at least a first user at a first location and a second user at a second location, comprising:
   a first pod at the first location for being entered by the first user;
   a first controller unit electrically connected with said first pod for receiving inputs and emitting outputs to said first pod;
   said first controller unit defining an electronic three-dimensional grid representative of said first pod;
   a plurality of first motion sensors electrically connected to said first controller unit for detecting movement within said first pod and providing said first controller unit input data associated with said detected movement, wherein said input data includes coordinates within said electronic three-dimensional grid representative of the detected movement;
   a plurality of first output devices disposed in said first pod and electrically connected with said first controller unit for selectively being activated;

a second pod at the second location for being entered by the second user;
a second controller unit electrically connected with said second pod for receiving inputs and emitting outputs to said second pod;
said second controller unit defining an electronic three-dimensional grid representative of said second pod;
at least one second motion sensor disposed in said second pod and electrically connected to said second controller unit for detecting movement within said second pod and providing said second controller unit input data associated with said detected movement, wherein said input data includes three-dimensional coordinates within said electronic three-dimensional grid representative of the detected movement;
a plurality of second output device disposed in said second pod and electrically connected with said second controller unit for selectively being activated; and
a mainframe electrically connected with said first and second controller units and configured to receive said input data from said first and second controller units and configured to provide instructions to said first control unit to activate said plurality of first output devices at three-dimensional coordinates in said first pod that correspond with said three-dimensional coordinates of said input data acquired by said second motion sensors, and configured to provide instructions to said second control unit to activate said plurality of second output devices at three-dimensional coordinates in said second pod that correspond with said three-dimensional coordinates of said input data acquired by said first motion sensors;
a first suit in said first pod for being worn by the first user and a second suit in said second pod for being worn by the second user, each of said first and second suits including a torso component for covering the user's torso, a pair of arm components for covering the user's arms, a pair of hand components for covering the user's hands, a pair of leg components for covering the user's legs, and a pair of foot components for covering the user's feet;
a first virtual reality headset in said first pod for being worn by the first user and for presenting a virtual reality gaming environment to the first user;
a second virtual reality headset in said second pod for being worn by the second user and for presenting the virtual reality gaming environment to the second user;
said first and second virtual reality headsets each including a user orientation system configured to provide a stabilizing or destabilizing sensation to the users relative to the virtual reality environment;
said first and second virtual reality headsets each further including a graphical user interface configured to be viewed by the users for simulating an occurrence in the virtual reality gaming environment based on the detected movements of the users within said first and second pods detected by said first and second motion sensors, and wherein each of said first and second virtual reality headsets is configured to track eye movement of the user to orient the users in the virtual reality environment;
wherein said first virtual reality headset includes a plurality of first headset actuation devices, and said second virtual reality headset includes a plurality of second headset actuation devices;
wherein said plurality of first output devices, said plurality of second output devices, said first headset actuation device, and said second headset actuation device each include a haptic feedback device for providing the user with tactile feedback based on actions taken or received in the virtual reality environment, a sound device configured to provide the user with audio feedback based on actions taken or received in the virtual reality environment, a thermal application device configured to provide the user with temperature feedback based on actions taken or received in the virtual reality environment, an air bladder device to apply a force to provide the user with the feeling of pressure applied or received based on the virtual reality environment, an electrical/magnetic impulse device configured to provide the user with electrical/magnetic feedback based on actions taken or received in the virtual reality environment, and a scent generator configured to release scents according to the virtual reality environment, wherein said first output devices are located on each of said torso, arm, hand, leg and feet components on said first suit, and wherein said second output devices are located on each of said torso, arm, hand, leg and feet components on said second suit for simulating occurrences in the virtual reality gaming environment.

2. A system as set forth in claim 1, wherein said user orientation system includes at least one of an intraoral device or a vestibular device.

3. A system for simulating a presence between at least a first user at a first location and a second user at a second location, comprising:
a first pod at the first location for being entered by the first user;
a first controller unit electrically connected with said first pod for receiving inputs and emitting outputs to said first pod;
said first controller unit defining an electronic three-dimensional grid representative of said first pod;
at least one first motion sensor electrically connected to said first controller unit for detecting movement within said first pod and providing said first controller unit input data associated with said detected movement, wherein said unit input data includes coordinates within said electronic three-dimensional grid representative of the detected movement;
a plurality of first output devices disposed in said first pod and electrically connected with said first controller unit for selectively being activated;
a second pod at the second location for being entered by the second user;
a second controller unit electrically connected with said second pod for receiving inputs and emitting outputs to said second pod;
said second controller unit defining an electronic three-dimensional grid representative of said second pod;
at least one second motion sensor disposed in said second pod and electrically connected to said second controller unit for detecting movement within said second pod and providing said second controller unit input data associated with said detected movement, wherein said unit input data includes three-dimensional coordinates within said electronic three-dimensional grid representative of the detected movement;
a plurality of second output devices disposed in said second pod and electrically connected with said second controller unit for selectively being activated;
a mainframe electrically connected with said first and second controller units and configured to receive said input data from said first and second controller units and configured to provide instructions to said first control unit to activate said plurality of first output devices at three-dimensional coordinates in said first pod that correspond with said three-dimensional coordinates of said input data acquired by said at least one second motion sensor, and configured to provide instructions to said second control unit to activate said plurality of second output devices at three-dimensional coordinates in said second pod that correspond with said three-dimensional coordinates of said input data acquired by said at least one first motion sensor;

a first suit in said first pod for being worn by the first user and a second suit in said second pod for being worn by the second user, each of said first and second suits including a torso component for covering the user's torso, a pair of arm components for covering the user's arms, a pair of hand components for covering the user's hands, a pair of leg components for covering the user's legs, and a pair of foot components for covering the user's feet;

wherein said plurality of first output devices and said plurality of second output devices each include a force application device for applying a force to the user, a thermal application device configured to vary a temperature for the user, an electric/magnetic impulse device, a sound device for emitting a sound to the user and a scent device for emitting a scent to the user located on each of said torso, arm, hand, leg and feet components on said first and second suits for simulating occurrences in a virtual reality gaming environment;

the first and second suits each further including a headset including a graphical user interface configured to be viewed by the users for simulating an occurrence in the virtual reality gaming environment based on the detected movements of the users within said first and second pods detected by said at least one first and second motion sensors, and wherein each of the headsets is configured to track eye movement of the user and to orient the users in the virtual reality environment;

wherein said first and second output devices each further include a plurality of headset actuation device mounted on said headsets of said first and second suits, wherein said headset actuation devices on each of said headsets include a scent generator for emitting a smell to the user, a force generator for applying a force to the head of the user, a sound device for emitting a sound to the user, and a thermal application device for varying a temperature at the user's head;

wherein said first and second output devices are each configured to simulate an occurrence in the virtual reality gaming environment on said virtual reality headset and said torso, arm, hand, leg and feet components based on the detected movements of the other of the first and second users detected by one of said at least one first and second motion sensors;

wherein said first and second output devices each further include an exoskeleton configured to alternate between a flaccid position and an energized position based on occurrences in the virtual reality gaming environment;

wherein the mainframe is configured to provide instructions to at least one of said first and second control units to activate a plurality of said first and second output devices to simulate a weight of an object being picked up by at least one of the users, to simulate casting of a spell, to simulate catching of an object, to simulate swinging of a weapon, and to simulate an impact of an object projected at the user.

4. The system as set forth in claim 3, wherein the mainframe is configured to provide instructions to each of the first and second control units to activate a plurality of said first output devices and a plurality of said second output devices to simulate a weight of an object being picked up by at least one of the users, to simulate casting of a spell, to simulate catching of an object, to simulate swinging of a weapon, and to simulate an impact of an object projected at the user.

5. The system as set forth in claim 1, wherein the mainframe is configured to provide instructions to at least one of said first and second control units to activate a plurality of said first and second output devices to simulate a weight of an object being picked up by at least one of the users, to simulate casting of a spell, to simulate catching of an object, to simulate swinging of a weapon, and to simulate an impact of an object projected at the user.

* * * * *